United States Patent [19]
Yanagihara et al.

[11] Patent Number: 5,609,407
[45] Date of Patent: Mar. 11, 1997

[54] VEHICULAR LAMPS, AND APPARATUS AND METHOD FOR MOLDING THE SAME

[75] Inventors: Hirokazu Yanagihara; Shirou Takezawa, both of Shimizu, Japan

[73] Assignee: Koito Manufacturing Co., Ltd., Tokyo, Japan

[21] Appl. No.: 413,691

[22] Filed: Mar. 30, 1995

[30] Foreign Application Priority Data

Apr. 25, 1994 [JP] Japan .................................. 6-107419

[51] Int. Cl.⁶ .................................................. B60Q 1/00
[52] U.S. Cl. ............................ 362/61; 362/294; 362/327; 362/373
[58] Field of Search ............................ 362/61, 294, 327, 362/373

[56] References Cited

U.S. PATENT DOCUMENTS

| | | | |
|---|---|---|---|
| 4,862,337 | 8/1989 | Ohshio et al. | 362/294 |
| 5,041,949 | 8/1991 | Hirota et al. | 362/61 |
| 5,095,410 | 3/1992 | Nagengast et al. | 362/61 |
| 5,406,467 | 4/1995 | Hashemi | 362/61 |

*Primary Examiner*—Ira S. Lazarus
*Assistant Examiner*—Alfred Basichas
*Attorney, Agent, or Firm*—Koda and Androlia

[57] ABSTRACT

A vehicular lamp in which a peripheral part of an air ventilation hole provided on a slope or the curved surface of a lamp body formed of resin is formed on a flat plane perpendicular to the moving direction of the movable mold for the lamp body, and the peripheral part of the air ventilation hole is constructed concavely or projectingly from the inner surface of the lamp body.

5 Claims, 7 Drawing Sheets

FIG. 12B

VEHICULAR LAMPS, AND APPARATUS AND METHOD FOR MOLDING THE SAME

BACKGROUND OF THE INVENTION

1. Field of the Invention

The present invention relates to a vehicular lamp having an air ventilation hole formed on a part of a lamp body for communicating a lamp chamber with the ambient air. More particularly, the invention relates to a vehicular lamp formed of resin, and apparatus and method for molding the lamp.

2. Related Art

Generally, a vehicular lamp for an automobile, e.g., is constituted by a reflector, an electric bulb, etc., both housed in a lamp chamber having a lamp body and a front lens. However, if the lamp chamber is sealed, there is a possibility that dew concentration will be generated on a lens surface when humidity is saturated in the lamp chamber, thereby to decrease light intensity irradiating from the lamp. Accordingly, an air ventilation hole has been provided in order to prevent the dew condensation for communicating the lamp chamber with the ambient air. When the vehicular lamp a body of which is formed of resin is molded, a molding section for forming the air ventilation hole is provided on a corresponding portion of a mold die unit for resin molding. By using the mold die with the molding section, an air ventilation hole is formed on the lamp body at the same time when the lamp body is injection molded by resin.

Figure 11:
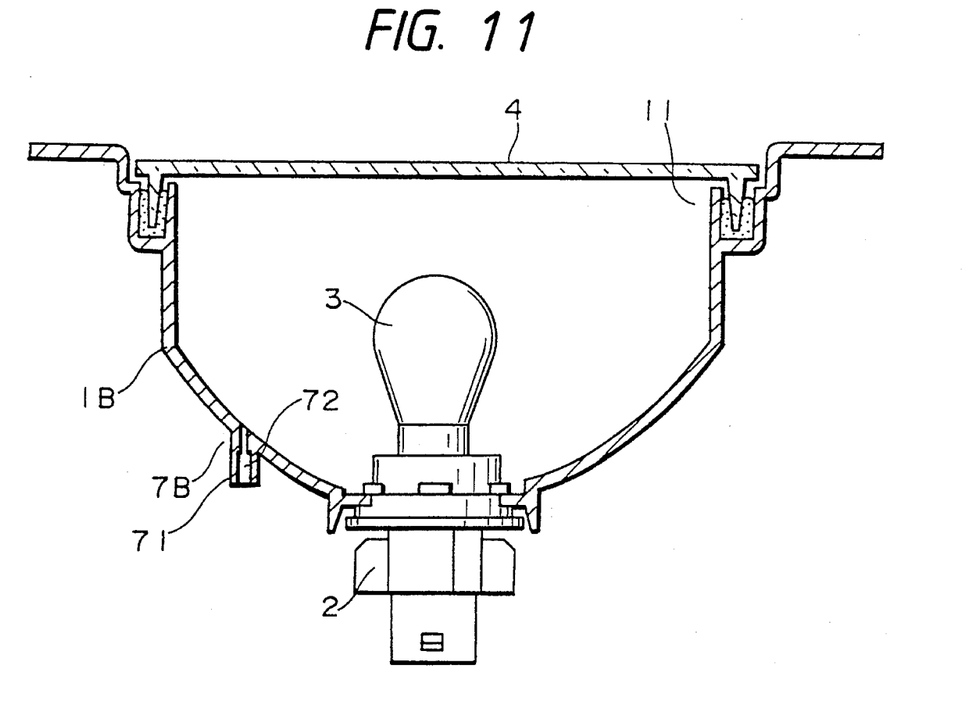
FIG. 11 is a sectional view showing the lamp having a conventional air ventilation hole.
Figure 12A:
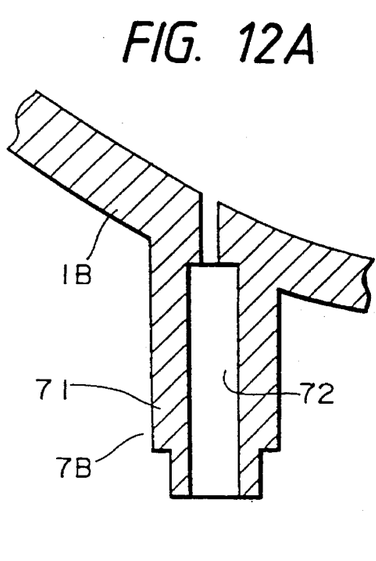
FIG. 12a is an enlarged sectional view showing a part of the air ventilation hole shown in FIG. 11

FIG. 11 is a sectional view showing a lamp having an air ventilation hole of the conventional type. FIG. 12A is a sectional view showing the vicinity of the air ventilation hole formed on the body thereof. The lamp includes a lamp body 1B, an electric bulb 3 supported by a bulb socket 2 on the lamp body 1B, and a lens 4 mounted on a front opening 11 of the lamp body 1B. An air ventilation hole 7B is formed on a part of a rear parabolic surface of the lamp body 1B so as to communicate a lamp chamber defined by the lamp body 1B and lens 4 with the outside ambient air. The air ventilation hole 7B is constructed by a boss 71 projecting from the rear surface of the lamp body 1B and a through hole 72 formed in the boss 71. In this case, on a part where the through hole 72 opens to the inner surface of the lamp body 1B, a diameter dimension of which is designed to be very small so as to prevent water from entering from the outside into the lamp chamber therethrough and also to avoid the adverse influence on light reflection when an inner surface of the lamp body 1B is subjected to reflection treatment to perform as a reflector.

Figure 12B:
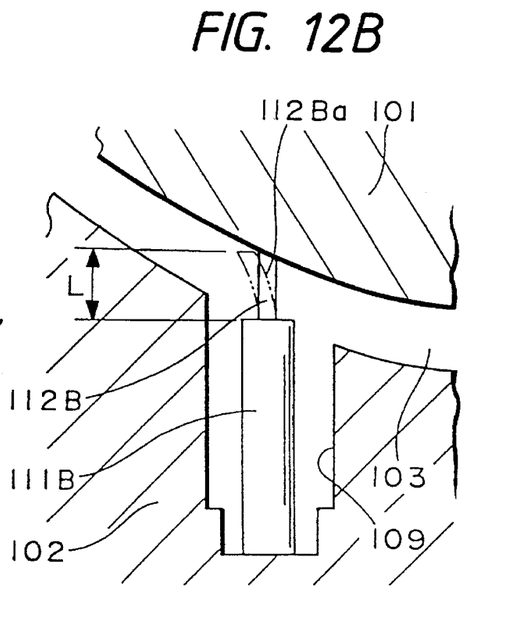
FIG. 12(b) is an enlarged sectional view showing a part of the molding apparatus for molding the air hole.

FIG. 12B is a sectional view showing a part of a molding apparatus for resin-molding the lamp body 1B having the air ventilation hole 7B. The molding apparatus includes a stationary mold 101 and a movable mold 102 which define a cavity 103 for molding the lamp body 1B. The movable mold 102 is provided with a recessed part 109 for forming the boss 71 and a molding pin 111B disposed therein for providing the through hole 72. The molding pin 111B is designed to be a stepped member and provided with a tip part 112B which is smaller in diameter than a base part thereof so as to form the tip opening of the through hole 72 very small as described above. Further, in this case, as the tip part 112 of the molding pin 111B is brought into close contact with the cavity surface of the stationary mold 101, the tip surface 112Ba is a slightly tapered and concave curved surface along the parabolic surface of the stationary mold 101.

When a lamp body is molded of resin using this molding apparatus, the movable mold 102 moves toward the stationary mold 101 side and the cavity 103 is defined therebetween, and then resin is injected into the cavity 103. At the molding operation, in order to form an air ventilation hole, the tip surface 112Ba of the molding pin 111B is brought into contact with the cavity surface of the stationary mold 101 by pressing. As the molding pin is formed with its tip surface 112Ba tapered, even when slight shifts in positions between the stationary mold 101 and the movable mole 102 are generated, a component of an abutting force therebetween is given to the tip part 112B of the molding pin.

Therefore, as shown by dotted lines in FIG. 12B, a state where the tip part 112B of the molding pin is bent outward along the curved surface of the stationary mold 101 is generated and as a result an air ventilation hole is formed on the molded lamp body in a bent state. Further, the bending force applied to the molding pin on the tip part 112B increases when the abutting force is large thereby causing problems in that the tip part 112B of the molding pin 111B is largely bent, deformed or broken.

In particular, as it is necessary to form the small-diameter molding pin with the length of the tip part 112B longer than that along the bending modulus of the inner surface of the lamp body 1B, i.e., larger than a distance L in FIG. 12B, it is relatively long and the tip part 112B of the molding pin is easy to be bent.

Further, with the molding apparatus, as it is necessary to fabricate the tip surface 112Ba of the molding pin 111B to be a tapered and slightly concave curved surface so as to correspond to the shape of the cavity of the stationary mold 101, the fabrication of the molding pin 111B, i.e., manufacturing of the mold die, is made more difficult.

Still further, the lamp body 1B is formed thicker and of more resin on the peripheral part of the air ventilation hole 7B than the other parts because of integral formation of the boss 71. Accordingly, since on this part the resin surface is cooled first and then the inner part is cooled, an undesirable shrinkage may be occurred on the inner surface of the lamp body due to the reduction of the resin volume. Such a shrinkage is occurred at unexpected portions of the peripheral part of the air ventilation hole 7B. Therefore, the shrinkage is different among products so that the quality of the lamp body and the entire lamp is deteriorated.

SUMMARY OF THE INVENTION

The present invention was made in view of the foregoing problems and difficulties accompanying the conventional vehicular lamps. Therefore, an object of the present invention is to provide a vehicular lamp capable of preventing damages to a molding apparatus used for molding a lamp body formed of resin having an air ventilation hole.

Another object of the invention is to provide a vehicular lamp which allows easy manufacturing of the molding apparatus.

It is another object of the invention to provide a vehicular lamp which capable of preventing undesirable shrinkage from occurring on the unexpected position of the lamp body.

Still another object of the invention is to provide an apparatus for and a method of molding the lamp body of a vehicular lamp with resin which allows easy manufacturing of a molding apparatus, reducing possibility of damages to the molding apparatus and preventing undesirable unexpected generation of the shrinkage on the lamp body to be molded.

The above and other objects can be achieved by a provision of a vehicular lamp in which, according to the present invention, a peripheral part of an air ventilation hole provided on a slope or the curved surface of a lamp body formed of resin is formed on a plane perpendicular to the moving direction of the movable mold for the lamp body.

The peripheral part of the air ventilation hole is constructed concavely or projectingly from the inner surface of the lamp body. Further, the air ventilation hole is formed tapered in cross section.

Further, a molding apparatus for a vehicular lamp according to the present invention including a pair of molds for defining a cavity for molding a lamp body, and one of the molds is provided with a flat part which is perpendicular to the moving direction of the movable mold die is formed on the area for molding the peripheral part of the air ventilation hole on the slope or the curved surface. The other mold is provided with a molding pin for molding the air ventilation hole with its tip surface brought into close contact with the flat part by pressing.

Still further, a method of manufacturing a vehicular lamp according to the present invention includes steps of forming on one mold of the molding apparatus for forming a cavity for molding the lamp body of resin a molding pin for forming the air ventilation hole disposed on the slope or the curved surface of the lamp body, and forming in the other mold a flat part perpendicular to the moving direction of the movable mold on the area for forming the peripheral part of the air ventilation hole, injecting a mold resin in the cavity in the condition where the molding pin and the flat part are in close contact.

Since the peripheral part of the air ventilation hole is constructed as a flat part, the tip surface of a molding pin for opening the air ventilation hole is formed on a flat surface, manufacturing of the molding pin can be made easily and bending of the molding pin can be prevented because of no force in a bending direction applied thereto when the tip part of the molding pin is brought into contact with the opposing mold.

Further, a flat part is formed on the periphery of the air ventilation hole. Thus, by limiting places where shrinkages are generated their influences can be reduced and occurrence of the shrinkage can be prevented on unexpected portions. In particular, a flat part is formed concavely from the inner surface of the lamp body. Thus, thickness thereon can be reduced and, therefore, occurrence of the shrinkage can be limited and by making shorter the length of the tip part of the molding pin bending thereof and damages thereto can be prevented.

Still further, the air ventilation hole is formed in a tapered shape. Thus, manufacturing of the molding pin can be made easily and releasing of the mold at the time of molding can be made readily.

PREFERRED EMBODIMENTS OF THE INVENTION

Preferred embodiments of the present invention will now be described with reference to the accompanying drawings.

Figure 1:
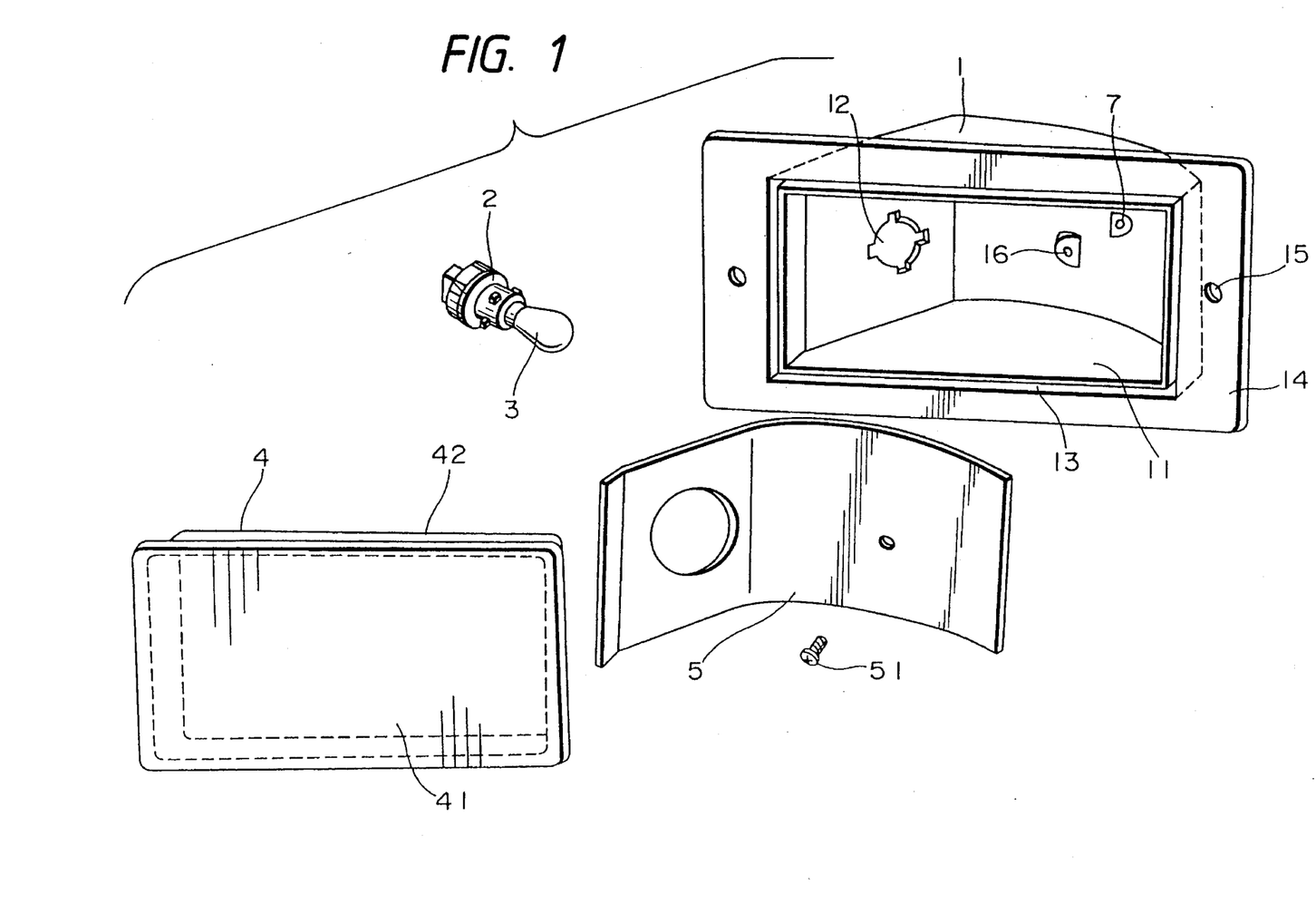
FIG. 1 is a partially exploded perspective view of a first embodiment applied to the back-up lamp.
Figure 2:
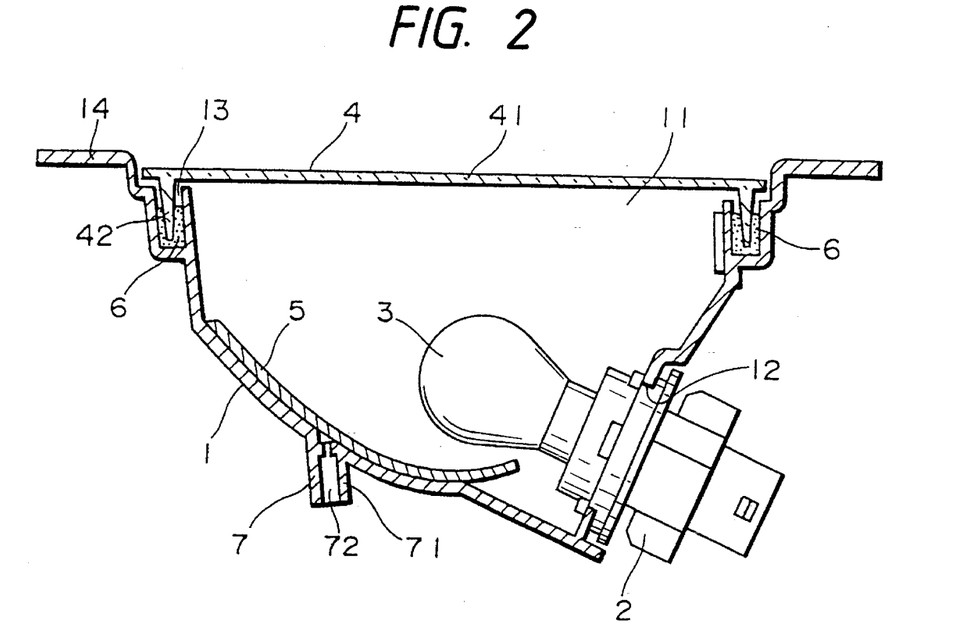
FIG. 2 is a sectional view showing the lamp in an assembled state.
Figure 3:
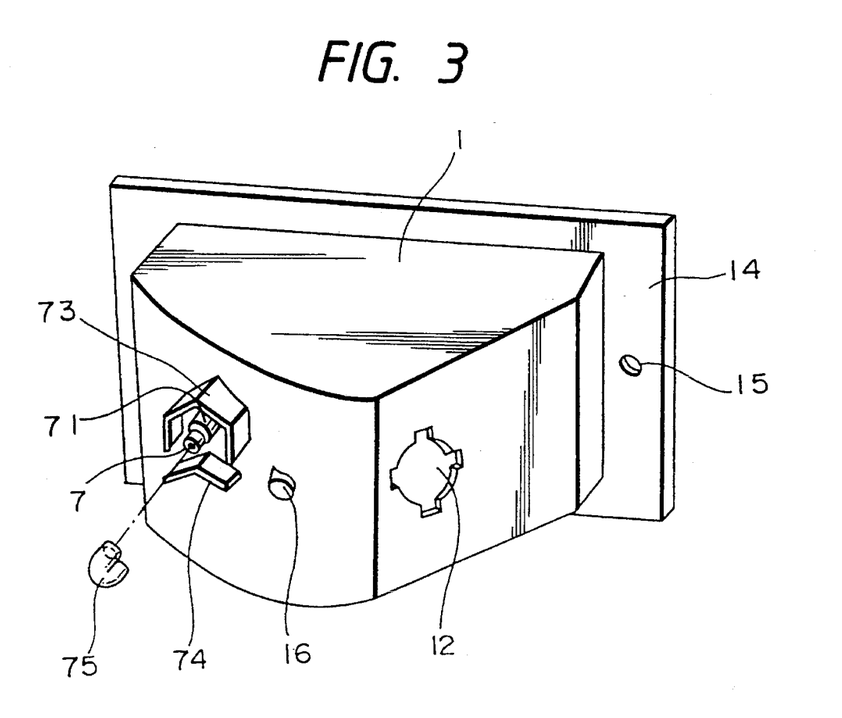
FIG. 3 is a perspective view showing the rear surface direction of the lamp body.
Figure 4:
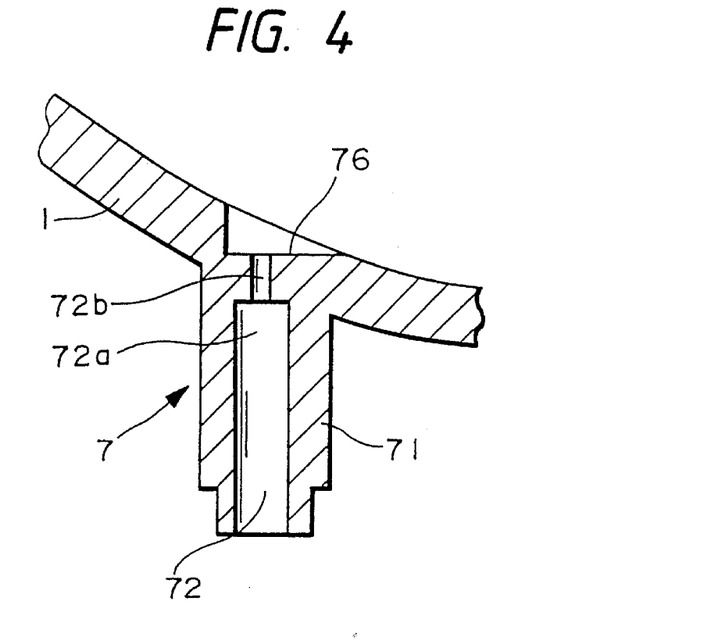
FIG. 4 is an enlarged sectional view showing a part of the air ventilation hole.
Figure 5:
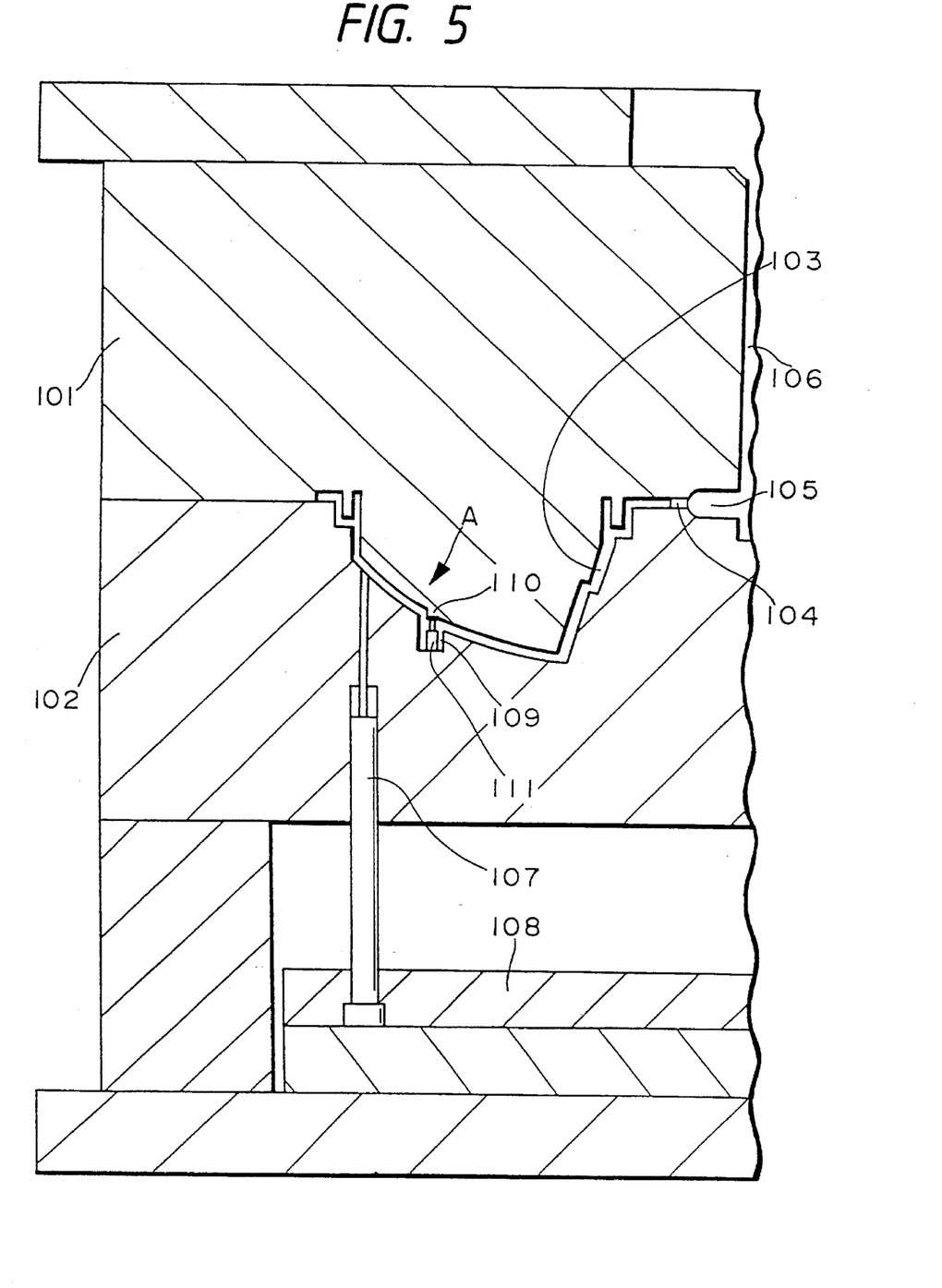
FIG. 5 is a sectional view showing the molding apparatus for forming the lamp body shown in FIG. 1.
Figure 6:
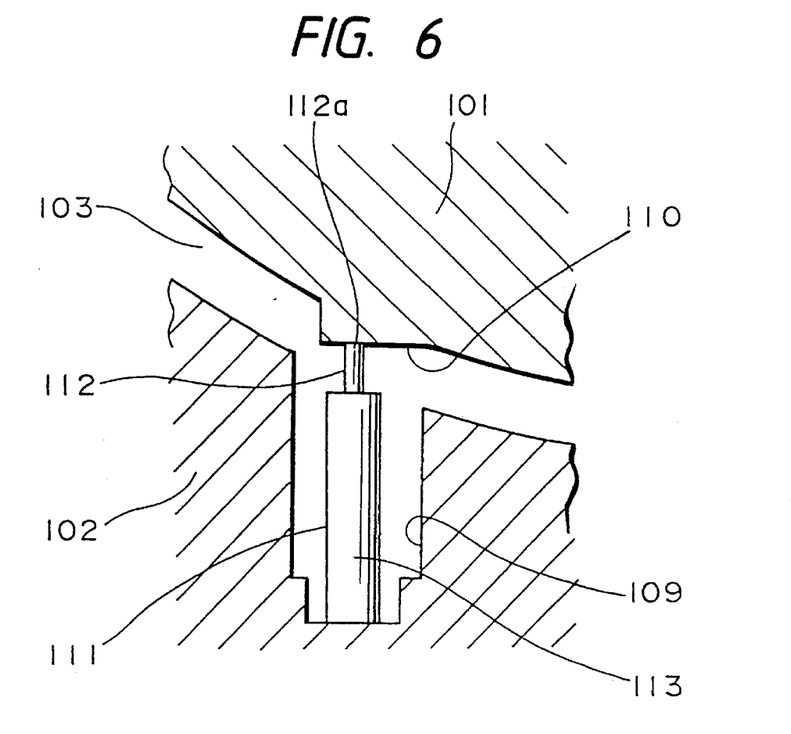
FIG. 6 is an enlarged view showing main parts of the molding apparatus shown in FIG. 5.

FIGS. 1 through 6 refer to a first embodiment of the present invention. Specifically, FIG. 1 is a partially exploded view in perspective of the embodiment of the invention applied to the backup lamp of a motor vehicle; FIG. 2 is a transverse sectional view showing the assembled condition; FIG. 3 is a perspective view showing the rear surface direction of the lamp body; FIG. 4 is an enlarged sectional view showing a part of the air ventilation hole; FIG. 5 is a sectional view showing the molding apparatus for forming the lamp body in FIG. 1; and FIG. 6 is an enlarged view showing main parts of the molding apparatus shown in FIG. 5.

As shown in the Figures, the lamp includes a cup-shaped lamp body 1 formed by injection molding with black resin having a rectangular front opening 11 and a rear parabolic portion. On the rear surface of the lamp body 1 an electric bulb inserting hole 12 is disposed a bulb socket 2 is fitted thereinto and a bulb 3 is supported within the lamp body by the socket 2. Further, the socket 2 is inserted from the rear side of the lamp body 1 and fitted into the inserting hole 12 by a bayonet structure. In the present embodiment, a white electric bulb 3 is employed as an example. On the other hand, a sealing groove 13 having a concave shape is formed along the peripheral part of the front opening 11 of the lamp body 1 and using this sealing groove 13 a substantially rectangular front lens 4 is attached to the lamp body 1. The front lens 4 is molded of white transparent resin and a required lens step not shown in the Figures is formed on the inner surface of a lens part 41 on its front and a sealed leg part 42 is projectingly formed around the lens facing a direction roughly orthogonal to the lens surface. The sealed leg part 42 is inserted into the sealing groove 13 of the lamp body 1, an adhesive 6 such as a hot melt material is injected into the sealing groove 13, and thereafter the adhesive 6 is solidified so that the lens 4 is attached to the lamp body 1.

On the outside of the sealing groove 13 described above, a flange 14 is provided so as to attach the lamp body 1 to the body of a motor vehicle, and an attaching hole 15 is provided on the flange 14. Further, a reflector 5 formed by bending a metal plate is disposed on the inner surface of the lamp body 1 and it is fixed there by a screw 51 put in a male screw part 16 provided on a part of the inner surface of the lamp body 1. The reflector 5 is formed in a parabolic shape along the inner surface of the lamp body 1 so as to reflect a light emitting from the electric bulb 3 toward the lens 4.

On the other hand, as shown in FIG. 2, an air ventilation hole 7 is disposed on the rear surface of the lamp body 1. The air ventilation hole 7 is provided with a circular boss 71 projecting from the rear surface of the lamp body 1, and a through hole 72 is formed in the boss 71. As shown in FIG. 3, on the other hand, a roof part 73 and a bottom plate part 74 project from the upper and lower sides, respectively, of the boss 71 on the rear surface of the lamp body 1 in order to prevent water drops entering the ventilation hole 72. The roof part 73 and the bottom plate part 74 surround roughly the entire periphery of the boss 71. Further, the tip part of the boss 71 is made slightly small in diameter and covered with a U-shape cover tube 75.

As shown by the expanded sectional view in FIG. 4, the ventilation hole 72 composing the air ventilation hole 7 is constructed by a large diameter part 72a provided along the boss 71 and a small diameter part 72b for communicating the large diameter part 72a with the inner surface of the lamp body 1. Then, around the part of the lamp body 1 where the small diameter part 72b is provided a flat part 76 is constructed so as to make flat the inner surface thereof and the flat part 76 is formed perpendicular to the longitudinal direction of the through hole 72. In other words, as the air ventilation hole 7 is formed toward the releasing direction, i.e., the movable mold moving direction of the molding apparatus described later, the flat part 76 is formed on a plane perpendicular to the mold moving direction thereof. Further, according to the first embodiment, the flat part 76 is formed in a state where a part of the inner surface of the lamp body 1 is made concave, and when viewed from the front side of the lamp body 1, it is formed in a substantially semicircular as the inner surface of the lamp body 1 is bent to be parabolic.

FIG. 5 is a sectional view showing the entire construction of the molding apparatus for resin molding the lamp body, wherein the cavity for forming the front lens is defined in the stationary mold 101 and the movable mold 102, a gate 104 is provided for injecting resin into a part of the stationary mold 101 facing the cavity 103, i.e., one side of the peripheral part of the lamp body, and it is connected to a runner 105 and a sprue 106. It is needless to say that the sprue 106 is connected to an injection nozzle provided on an injection molding machine not shown which installs therein the molding apparatus. A pushing pin 107 is provided on a part of the movable mold 102 with a base end part supported on a pushing plate 108. When the movable mold 102 removes from the stationary mold 101 after molding the lamp body, then the pushing plate 108 thrusts toward the movable mold 102, the molded lamp body which is still stuck to the movable mold 102 is pushed out thereof by a tip of the pushing pin 107.

FIG. 6 is an expanded view showing a part of the molding apparatus for forming the air ventilation hole 7, i.e., an A part of FIG. 5, wherein a concave part 109 is formed on a part of the movable mold 102 with its axial direction facing the moving direction thereof and the boss 71 is molded in the concave part 109. A flat part 110 which is perpendicular to the axial direction of the concave part 109 projects from a part of the stationary mold 101 placed opposed to the concave part 109. The flat part 110 having a substantially pedestal shape projects in a horizontal direction from the curved cavity surface parabolicly projecting on the stationary mold 101. As described above, the flat part 110 is substantially semicircular when viewed from the front.

A molding pin 111 is disposed on the bottom part of the concave part 109 provided on the movable mold 102 for molding the through hole 72. The molding pin 111 is formed with its tip part 112 small in diameter and the base part 113 on the lower side large in diameter. Then, the tip surface 112a of this small-diameter pin tip part 112 is formed on a plane perpendicular to the longitudinal direction of the molding pin 111 so as to be perpendicularly brought into contact with the flat part 110 of the stationary mold 101 by pressing.

Thus, when a lens is formed of resin using the mold apparatus, white transparent resin is injected into the cavity 103 via the sprue 106 and the runner 105. After the resin is injected into the cavity 103, it is solidified. After solidification, the movable type 102 is retreated from the stationary mold 101, the projecting plate 108 is moved, the molded lamp body which is still stuck to the movable mold 102 is pushed out by the tip of the pushing pin 107 and released therefrom. When the molding operation takes place, first the movable mold 102 is brought into contact with the stationary mold 101 by pressing and the cavity 103 is defined therebetween. Then, on a part where the air ventilation hole 7 is formed, the tip surface 112a of the molding pin 111 is brought into contact with the cavity surface of the stationary mold 101.

At this time, as the tip surface 112a is formed on a plane which is perpendicular to the moving direction of the movable mold 102 and the flat part 110 is formed on the cavity surface of the stationary mold 101 with which the molding pin 111 is brought into contact by pressing in the same manner, the tip surface 112a of the molding pin 111 and the flat part 110 are brought into contact by pressing with the same plane perpendicular to the moving direction thereof. In this way, when the molding pin 111 is brought into contact with the flat part 110 by pressing, an abutting force on the molding pin 111 is generated in the moving direction of the movable mold 102, in other words in the longitudinal direction of the molding pin 111. Thus, a force of a bending direction is not applied on the small-diameter tip part 112 of the molding pin and the bent deformation thereof can be prevented.

On the other hand, as shown in FIG. 4, the resin-formed lamp body is provided with the flat surface 76 formed around the through hole 72 of the air ventilation hole 7 in a state where it is retreated more than the parabolic inner surface of the lamp body 1. Thus, though the air ventilation hole 7 has greater resin volume on the area of this flat surface 76 than the other parts due to the existence of the boss 71, its level is smaller than that for the conventional structure and, therefore, the undesirable occurrence of the shrinkage can be suppressed. Should the shrinkage be generated, they are generated only on the flat surface 76.

For this reason, the occurrence of the shrinkage on unexpected portions of the peripheral part of the air ventilation hole 7 on the inner surface of the lamp body 1 can be prevented, an area where the shrinkages are occurred can be certified and this area is constructed not parabolicly but in a plane. These in turn effectively reduces visibility of the shrinkage and prevent the deterioration in external appearance and quality of the lamp.

Further, as described above, thickness of the flat surface 76 on the inner surface of the lamp body 1 is smaller than the conventional one. Thus, as shown in FIG. 6, the molding pin 111 for forming the air ventilation hole 7 on the lamp body 1 is formed in such a manner that the length of its small-diameter tip part 112 is made short in accordance with reduction of thickness, and the bent deformation of the tip part 112 can be more effectively prevented.

Figure 7:
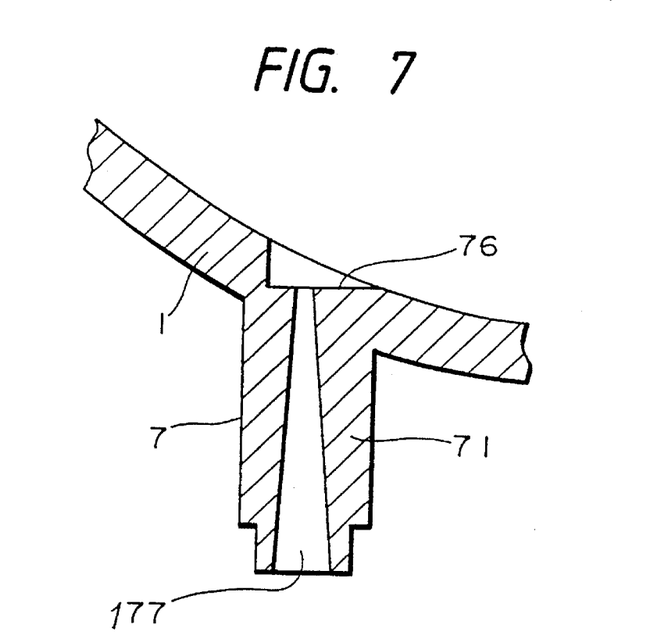
FIG. 7 is a sectional view showing the air ventilation hole according to a second embodiment of the present invention.

FIG. 7 is a sectional view showing the air ventilation hole according to the second embodiment of the present invention. Herein, as its only main part is shown in FIG. 7, a through hole 177 of the air ventilation hole 7 is tapered in cross section. In the second embodiment, the molding pin to be provided on the movable mold of the molding apparatus is formed with its tip part made gradually small in diameter and thus tapered correspondingly. Then, the tip surface of the molding pin is formed on a plane perpendicular to the moving direction of a moving piece corresponding to the flat part 110 provided on the cavity surface of the stationary mold 101.

Thus, by forming the air ventilation hole using the tapered molding pin, it is not necessary to form the tip thereof small in diameter and, accordingly, the mechanical strength on the tip part can be improved. Therefore, it is possible to more effectively prevent bending and deformation of the molding pin caused by an abutting force applied when the molding pin is brought into contact with the flat surface of the stationary mold by pressing.

Further, by constructing the molding pin in a tapered form, it is made easier to pull the molding pin out of the ventilation hole 77 when the lamp body is released from the movable mold after it is molded. Also, as it is made unnecessary to construct a step on the molding pin as in the first embodiment, manufacturing of the molding pin can be made readily at the time of manufacturing the molding apparatus.

Figure 8:
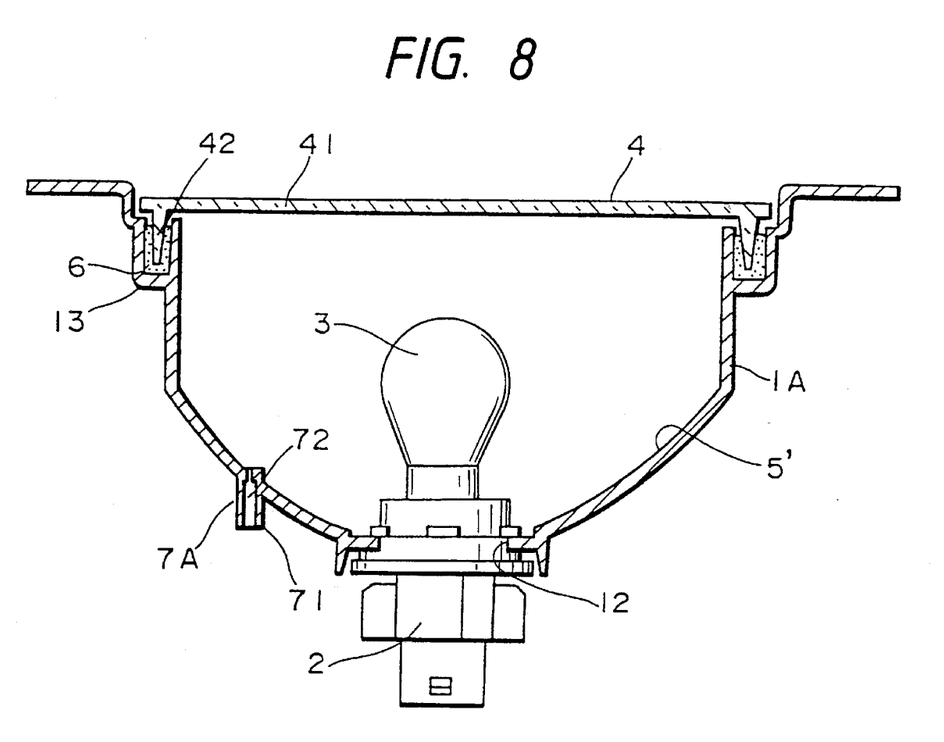
FIG. 8 is a sectional view showing the lamp at the third embodiment of the present invention.

FIG. 8 is a transverse sectional view showing the third embodiment. In the drawings, the vehicular lamp according to the third embodiment includes a lamp body 1A and an electric bulb socket 2 fitted into a bulb inserting hole 12 provided on the rear surface of the lamp body 1A. The bulb socket 2 supporting therein an electric bulb 3. Further, the vehicular lamp is provided with a front lens 4, a seal leg part 42 provided on the peripheral part of a lens part 41. The sealed leg part 42 is fitted into a sealing groove 13 disposed on the peripheral part of the lamp body 1A and fixed thereto by an adhesive 6.

According to the third embodiment, a reflector constructed by a separate member is not incorporated on the inner surface of the lamp body 1A, the parabolic inner surface of the lamp body 1 is coated with aluminum, etc., to perform as a reflector. Further, a boss 71 composing an air ventilation hole 7A projects from the rear surface of the lamp body 1A and a ventilation hole 72 opens in the boss 71 so as to communicate the inside of the lamp chamber of the lamp body 1A with atmosphere. On the rear surface of this lamp body 1A a roof part and a bottom plate part not shown are provided on both upper and lower positions of the boss 71 as in the case of the first embodiment, a cover tube is fitted in the tip part of the boss 71, so that water drop is prevented from entering the lamp chamber via the through hole 72.

Figure 9:
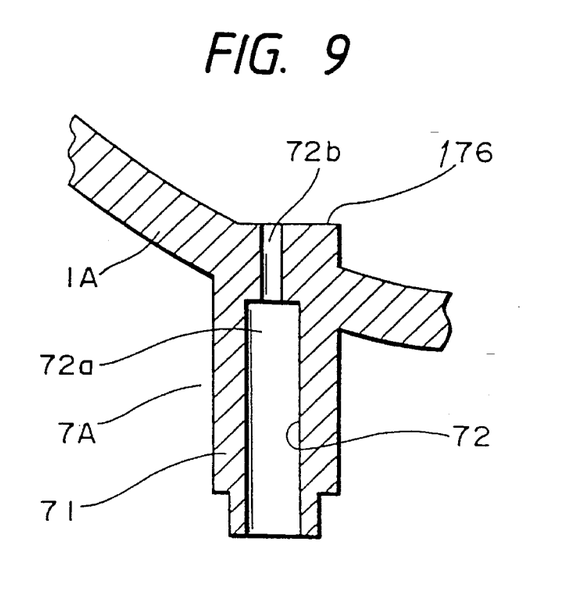
FIG. 9 is an enlarged sectional view showing a part of the air ventilation hole of the vehicular lamp shown in FIG. 8.

As shown by the expanded view in FIG. 9, the air ventilation hole 7A opens in the longitudinal direction of the boss 71 therewithin, i.e., in the moving direction of the movable mold of the molding apparatus. As in the case of the first embodiment, the boss 71 has a step with a large diameter part 72a and a small diameter part 72b. Then, on the inner surface of the lamp body 1A around the air ventilation hole 7A a flat surface 76 is formed in such a way that it is made to be a pedestal with one side projecting from the parabolicly curved surface and the surface of the flat part 76 is formed flat perpendicular to the axial direction of the through hole 72.

Figure 10:
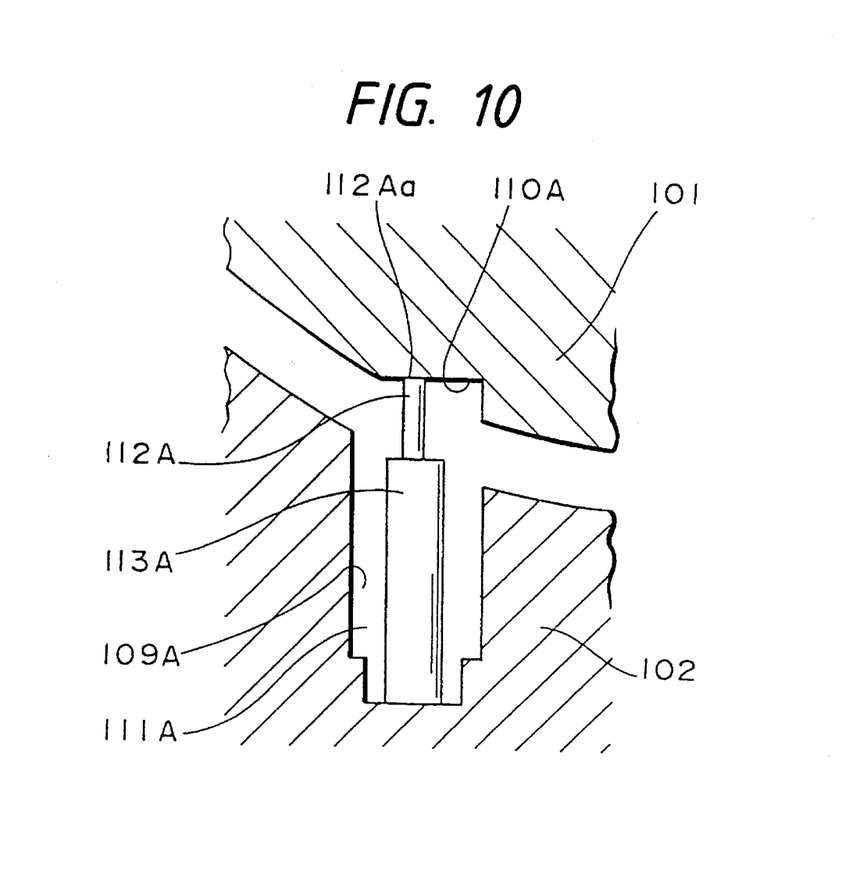
FIG. 10 is a sectional view showing main parts of the molding apparatus for molding the lamp of FIG. 8.

With the molding apparatus for molding the lamp body of resin, as shown by the sectional view of its main part in FIG. 10, the stationary mold 101 is provided with a flat part 110A formed on a concavely provided part of the cavity surface, the movable mold 102 is provided with a concave part 109A for molding a boss on a position opposing to the flat part 110A and a molding pin 111A disposed therein. The molding pin 111A has a step with a large-diameter base part 113A and a small-diameter tip part 112A, and this tip part 112A is formed slightly longer than the one described in the first embodiment.

According to the third embodiment, the molding apparatus shown in FIG. 10 allows formation of the flat part 110A in a concave shape by eliminating a part of the cavity surface of the stationary mold 101 at the conventional molding apparatus shown in FIG. 12B. The molding pin 111A of the movable mold 102 is, as similar to the case of the first embodiment, formed in such a way that the tip surface 112Aa of the tip part 112A is made flat perpendicular to the longitudinal direction of the pin.

Thus, it is made possible to manufacture the molding apparatus of the present invention by using the conventional metallic mold as it is. If the lamp body is molded by using the molding apparatus, as the tip surface 112Aa of the molding pin 111A of the movable mold 102 is made flat perpendicular to the moving direction of the stationary mold 101, an abutting force applied onto the molding pin 111 when it is brought into contact with the flat part 110A of the stationary mold 101 is applied in the moving direction of the movable mold 102, i.e., in the longitudinal direction of the molding pin 111A. For this reason, without a force of a bending direction applied onto the small-diameter tip part 112A of the molding pin 111A bending and deformation thereof may be prevented.

Further, the resin-formed lamp body is provided with the flat surface 76 formed projectingly more than the inner surface of the parabolic lamp body 1A on the periphery of the ventilation hole 72 of the air ventilation hole 7A.

Even when the undesirable shrinkage are occurred in the vicinity of the air ventilation hole 7A, they are mostly generated on the flat surface 76 as in the case of the first embodiment, and thus unexpected occurrence of which can be prevented. Further, the shrinkage is not visible, and external appearance and quality of lamp are not deteriorated.

Further, according to the third embodiment, though the inner surface of the lamp body 1A is subjected to a reflection treatment to perform as a reflector, the periphery of the air ventilation hole 7A is constructed as the flat surface 76 formed projectingly slightly more than the inner surface thereof and, therefore, a light emitting from the electric bulb 3 is reflected on this flat surface 76, as well. Thus, this part is not seen dark and a lamp appearance is not deteriorated.

Furthermore, at the third embodiment, the air ventilation hole is tapered in cross section as similar to the case of the first embodiment and effects can be obtained as similar to the case of the second embodiment.

As described above, according to the present invention, the peripheral part of the air ventilation hole opening on the slope or the curved surface of the resin-formed lamp body is formed on a plane perpendicular to the moving direction of the movable mold. Thus, the tip surface of the molding pin provided on the molding apparatus for forming the air ventilation hole can be formed as a plane to be brought into contact with the above-mentioned plane by pressing, thereby allowing manufacturing of the molding pin to be easier, a force in a bending direction is not applied on the molding pin when the tip part of which is brought into contact with the opposing molding apparatus by pressing and, therefore, bending of the molding pin can be prevented.

Further, as the peripheral part of the air ventilation hole is constructed on a plane, an area where shrinkages are generated is limited, so that the shrinkages are prevented from occurring at unexpected portions. Therefore, the undesirable shrinkage is not visible.

In particular, by forming the peripheral part of the air ventilation hole concavely from the inner surface of the lamp body, it is possible to reduce thickness thereof, make it harder to generate shrinkage and make it still harder to bend the molding pin.

Also, by forming the air ventilation hole tapered in cross section, manufacturing of the molding pin may be made easier and releasing of the movable mold after molding the lamp body can be readily carried out.

Further, according to the present invention, one of the stationary and movable molds for defining the cavity of the resin-molded lamp body is provided with a flat portion perpendicular to the moving direction of the movable mold on the area for molding the peripheral part of the air ventilation hole provided on the slope or the curved surface, whereas the other mold is provided with the molding pin for forming the air ventilation hole. Then, by forming the tip surface of the pin on a plane to be brought into close contact with the flat part by pressing, it is made possible to form the lamp body having a plane perpendicular to the moving direction of the movable mold on the peripheral part of the air ventilation hole thereof.

Furthermore, according to the present invention, one of the molds of the molding apparatus is provided with the molding pin for forming the air ventilation hole provided on the slope or the curved surface of the lamp body while the other mold is provided with a flat part perpendicular to the moving direction of the movable mold on the area for molding the peripheral part of the air ventilation hole. Accordingly, as resin molding is carried out by injecting resin into the cavity in a state where these molding pin and flat part are in close contact, it is made possible to form the lamp body having a plane perpendicular to the moving direction of the movable mold on the peripheral part of the air ventilation hole thereof.

What is claimed is:

1. A vehicular lamp comprising:

a lamp body having a front opening formed of resin, a reflector disposed in said lamp body;

a front lens mounted on a front opening of said lamp body;

a projection formed in a curved surface of said lamp body, said projection having a flat top surface; and an air ventilation hole having a through hole disposed on the curved surface of said lamp body and extending into said projection, said ventilation hole being formed perpendicular to said flat top surface of said projection.

2. A vehicular lamp comprising:

a lamp body having a front opening formed of resin;

a reflector disposed in said lamp body;

a front lens mounted on said front opening of said lamp body;

a recess formed in a curved surface of said lamp body, said recess having a flat bottom surface; and an air ventilation hole having a through hole disposed on the curved surface of the lamp body and extending into said recess, said air ventilation hole being formed perpendicular to said flat bottom surface of said recess.

3. The lamp for vehicles according to any one of claims 2 or 1, wherein said air ventilation hole comprises a base part and a tip part a diameter of which is smaller than that of said base part.

4. The lamp for vehicles according to claim 3, wherein said air ventilation hole is tapered in cross section.

5. The lamp for vehicles according to claim 3, wherein said air ventilation hole comprises a step.

* * * * *